Patented Oct. 31, 1922.

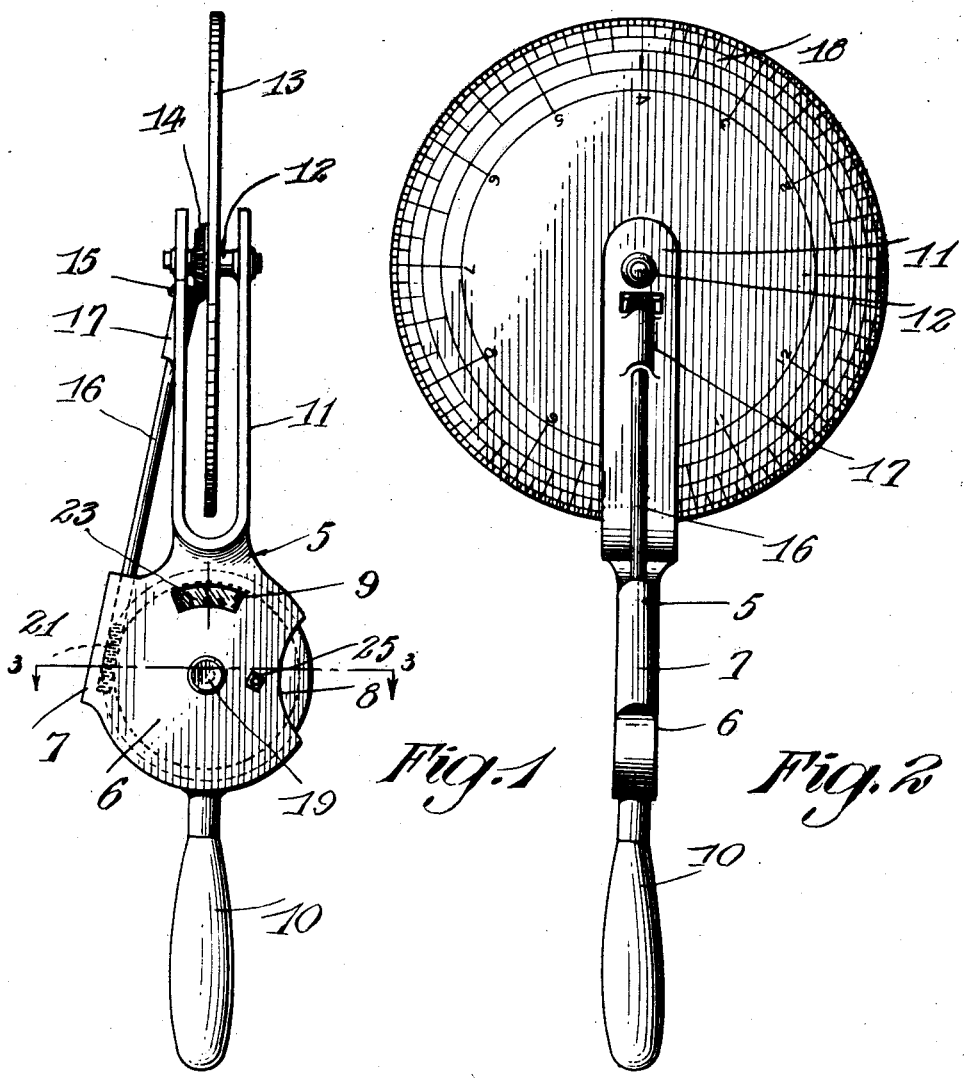
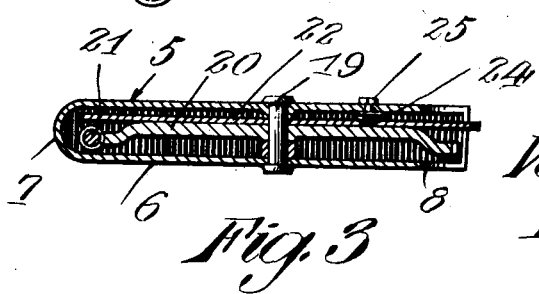

1,433,640

UNITED STATES PATENT OFFICE.

VALÈRE MORNEAU, OF MONTREAL, QUEBEC, CANADA.

MEASURING INSTRUMENT.

Application filed April 22, 1921. Serial No. 463,582.

*To all whom it may concern:*

Be it known that I, VALÈRE MORNEAU, a subject of the King of Great Britain, residing at Montreal, Province of Quebec, Canada, have invented certain new and useful Improvements in Measuring Instruments; and I do hereby declare that the following is a full, clear, and exact description of the invention, such as will enable others skilled in the art to which it appertains to make and use the same.

The present invention relates to new and useful improvements in measuring instruments.

The primary object of the invention is the provision of a measuring instrument, such as above referred to, so arranged that by moving the instrument along the article or space to be measured, it will register the distance in feet, inches, or fractions thereof.

A further object of the invention is the provision of a measuring instrument so arranged that as it is moved over the object or space to be measured, it will audibly indicate the number of revolutions made by the measuring wheel in order that the distance can be ascertained without examining the registering dial.

A still further object of the invention is the provision of a measuring instrument such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawing, forming a part of the present application, and in which:

Figure 1 is a side elevation of the instrument;

Figure 2 is an edge view thereof, showing the measuring wheel in plan view; and, Figure 3 is a transverse sectional view taken on the line 3—3 of Figure 1.

Referring now to the acompanying drawing by corresponding characters of reference throughout the several views, the numeral 5 designates in general my improved measuring instrument which comprises a substantially cylindrical body portion 6 of flattened formation provided at one edge with a tubular extension 7, at its opposite edge with a cut-away portion 8, and in one side thereof with a sight opening 9.

A handle 10 extends from one edge of the body portion 6, while from the opposite edge thereof extends a fork 11 between the ends of which is mounted a drive shaft 12 which carries keyed thereon a measuring wheel 13 and a bevelled gear 14. This bevelled gear 14 meshes with a pinion 15 keyed to the lower end of a drive shaft 16 which is journaled in a bearing 17 provided in one side of the fork 11 and in the tubular extension 7 above referred to.

One side of the measuring wheel 13 is graduated to indicate inches and fractions thereof, as shown at 18, while journaled centrally of the body portion 6 is a shaft 19 upon which is rotatably mounted a worm wheel 20 which meshes with a worm 21 carried by the upper end of the shaft 16 within the tubular portion 7 of the body 6.

A registering dial 22 is secured to one side of the worm wheel 20, and projects through the cut-away portion 8. Upon the wheel 20 are marked suitable indication marks, shown at 23, which cooperate with the measuring wheel 13 in indicating the distance travelled by this said wheel through the instrumentality of the driving connections therebetween.

The dial 22 is provided in its face with a depression 24 which receives a spring actuated pin 25 in order that upon each rotation thereof, the dial will give a clicking sound to indicate that it has made one revolution.

In use, the dial 22 is set at the zero mark by grasping the exposed edge thereof which extends through the opening 8 and turning it to the proper position.

The measuring wheel 13 is then placed upon one end of the object and rolled over its surface until it reaches the opposite end thereof, and it will be readily seen that the distance will be travelled by the said wheel which indicates the length of the object or space to be measured upon the said dial 22.

From the foregoing description taken in connection with the accompanying drawing, it will be manifest that a measuring instrument is provided, which will fulfil all of the necessary requirements of such a device, and it should be understood in this connection that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. The herein described measuring instrument, comprising a body portion having a sight opening therein, a handle at one side thereof and a fork at the other side thereof, a registering dial within the body portion, having indication marks thereon observable through the sight opening, and a measuring wheel journaled in the fork and operatively connected to the dial, said dial having a depression within it, a spring actuated pin supported in the path of the depression and engageable therewith, upon each revolution of the dial, to audibly indicate a complete revolution of the measuring wheel, as and for the purposes set forth.

2. A measuring instrument comprising a body portion having a sight opening in one side thereof, a handle at one edge thereof and a fork at its opposite edge, a registering dial journaled in the body portion, and having indication marks thereon, observable through the sight opening, a measuring wheel journaled in the fork, a gear connected to the measuring wheel, a gear connected to the registering dial, said dial having a depression within it, a spring actuated pin supported in the path of the depression and engageable therewith upon each revolution of the dial, to audibly indicate a complete revolution of the measuring wheel, a shaft, a gear at one end of the shaft meshing with the gear of the measuring wheel, a worm at the opposite end thereof meshing with the gear of the registering dial, substantially as and for the purposes set forth.

3. A measuring instrument comprising a body portion having a tubular extension at one edge thereof, a cut-away portion at the other edge thereof and having a sight opening in its side, a handle extending from one edge of the body portion, a fork extending from the opposite edge of the body portion, a measuring wheel journaled in said fork, a shaft journaled transversely of said body portion, a worm wheel rotatable upon the shaft, a registering dial secured to the worm wheel and rotatable therewith, said dial being exposed through the cut-away portion of said body portion, said dial having indication marks thereupon observable through the sight opening and having a depression formed therein, a spring actuated pin in the path of the depression and engageable therewith, upon each revolution of the dial to audibly indicate a complete revolution of the measuring wheel, said wheel having indication marks thereon cooperating with the marks upon the dial, a gear secured to the measuring wheel, a bearing provided at one side of the fork, a shaft journaled in said bearing and in said tubular extension, a gear keyed to the shaft adjacent the bearing and meshing with the gear of the measuring wheel, and a worm keyed to the shaft within the tubular extension and meshing with the worm wheel, substantially as and for the purposes set forth.

In witness whereof I have hereunto set my hand.

VALÈRE MORNEAU.